US012419808B2

(12) United States Patent
Price

(10) Patent No.: US 12,419,808 B2
(45) Date of Patent: Sep. 23, 2025

(54) VIAL CLOSURE FOR REHYDRATING MEDICATION

(71) Applicant: Viant Medical, LLC, Tempe, AZ (US)

(72) Inventor: Cory Price, Newport Beach, CA (US)

(73) Assignee: VIANT MEDICAL, LLC, Tempe, AZ (US)

( * ) Notice: Subject to any disclaimer, the term of this patent is extended or adjusted under 35 U.S.C. 154(b) by 603 days.

(21) Appl. No.: 17/588,666

(22) Filed: Jan. 31, 2022

(65) Prior Publication Data

US 2022/0151874 A1 May 19, 2022

Related U.S. Application Data

(62) Division of application No. 16/117,177, filed on Aug. 30, 2018, now Pat. No. 11,253,431.

(60) Provisional application No. 62/552,136, filed on Aug. 30, 2017.

(51) Int. Cl.
*A61J 1/20* (2006.01)
*A61J 1/14* (2023.01)
*A61J 1/06* (2006.01)

(52) U.S. Cl.
CPC ........... *A61J 1/2089* (2013.01); *A61J 1/1418* (2015.05); *A61J 1/201* (2015.05); *A61J 1/2096* (2013.01); *A61J 1/065* (2013.01); *A61J 1/2093* (2013.01)

(58) Field of Classification Search
CPC ........ A61J 1/065; A61J 1/1418; A61J 1/1412; A61J 1/201; A61J 1/2006; A61J 1/2089; A61J 1/2093; A61J 1/2096
See application file for complete search history.

(56) References Cited

U.S. PATENT DOCUMENTS 2,487,236 A * 11/1949 Greenberg ............... A61C 5/66 366/602
3,156,369 A * 11/1964 Bowes ................. B65D 51/285 215/250
3,603,469 A * 9/1971 Magni .................. B65D 51/285 215/DIG. 8
3,651,990 A * 3/1972 Cernei ................. B65D 25/087 206/229
3,840,136 A * 10/1974 Lanfranconi ........ B65D 51/226 222/83.5
4,195,731 A * 4/1980 Cavazza ............ B65D 51/2814 366/602
6,568,439 B1 * 5/2003 Se ........................ B65D 51/002 141/330
6,840,373 B2 * 1/2005 Gibler ................ B65D 51/2842 215/DIG. 8
7,025,200 B2 * 4/2006 Fontana ................ A61J 1/2093 206/222
7,249,690 B2 * 7/2007 Smith ................ B65D 51/2835 222/153.05
7,325,676 B2 * 2/2008 Galaz Rodriguez ......................... B65D 51/2814 220/254.1

(Continued)

*Primary Examiner* — Quynh-Nhu H. Vu
(74) *Attorney, Agent, or Firm* — SNELL & WILMER L.L.P.

(57) ABSTRACT

A vial cap is configured to releasably contain a portion of a material, for example a powdered medication, for dispensing into a container. Via operation of a depressable plunger, the material is released into the container for rehydrating and mixing with a liquid, and thereafter may be extracted, such as via a needle. In this manner, a rehydrated medication may be provided in a predetermined amount and at a desired time.

14 Claims, 18 Drawing Sheets

(56) References Cited

U.S. PATENT DOCUMENTS

| | | | | |
|---|---|---|---|---|
| 7,503,453 | B2 * | 3/2009 | Cronin | B65D 47/243<br>215/DIG. 8 |
| 7,748,550 | B2 * | 7/2010 | Cho | B65D 51/285<br>220/521 |
| 7,854,104 | B2 * | 12/2010 | Cronin | B65D 47/243<br>206/219 |
| 7,951,109 | B2 * | 5/2011 | Anderson | A61J 1/2096<br>604/416 |
| 8,167,155 | B2 * | 5/2012 | Hsieh | B01F 35/7139<br>215/DIG. 8 |
| 8,387,786 | B2 * | 3/2013 | Fontana | B65D 51/2892<br>215/DIG. 8 |
| 8,418,865 | B2 * | 4/2013 | Cho | B65D 51/1672<br>220/521 |
| 8,783,452 | B2 * | 7/2014 | Thoman | B65D 51/285<br>206/219 |
| 8,844,715 | B2 * | 9/2014 | Lee | B65D 51/2864<br>222/129 |
| 11,246,802 | B2 * | 2/2022 | Tsakas | B65D 51/002 |
| 2004/0226835 | A1 * | 11/2004 | Takahashi | B65D 51/2878<br>206/219 |
| 2006/0108314 | A1 * | 5/2006 | Cho | B65D 51/285<br>215/253 |
| 2009/0057262 | A1 * | 3/2009 | Cho | B65D 51/2864<br>215/231 |
| 2009/0139951 | A1 * | 6/2009 | Chen | B65D 51/2835<br>29/525 |
| 2017/0258683 | A1 * | 9/2017 | Tsakas | B65B 63/08 |

* cited by examiner

VIAL CLOSURE FOR REHYDRATING MEDICATION

CROSS-REFERENCE TO RELATED APPLICATIONS

This application is a divisional of U.S. Ser. No. 16/117,177 filed on Aug. 30, 2018, now U.S. Patent Application Publication 2019-006169 entitled "VIAL CLOSURE FOR REHYDRATING MEDICATION." U.S. Ser. No. 16/117,177 claims priority to and the benefit of U.S. Provisional Patent Application No. 62/552,136 filed on Aug. 30, 2017 and entitled "VIAL CLOSURE FOR REHYDRATING MEDICATION." Each of the foregoing applications are hereby incorporated by reference in their entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to medical applications, and in particular to vial enclosures configured to contain an anhydrous medicine prior to rehydration.

BACKGROUND

Medications are often stored in an anhydrous form, for example in order to increase stability, shelf life, or the like. However, many medications must be delivered intravenously, and thus must be rehydrated prior to administration. Accordingly, improved systems and methods for rehydration of medications remain desirable.

BRIEF DESCRIPTION OF THE DRAWINGS

With reference to the following description and accompanying drawings.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for container sealing, opening, materials mixing, drug rehydration, syringe operation, and the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical rehydrating vial closure.

Figure 1A:
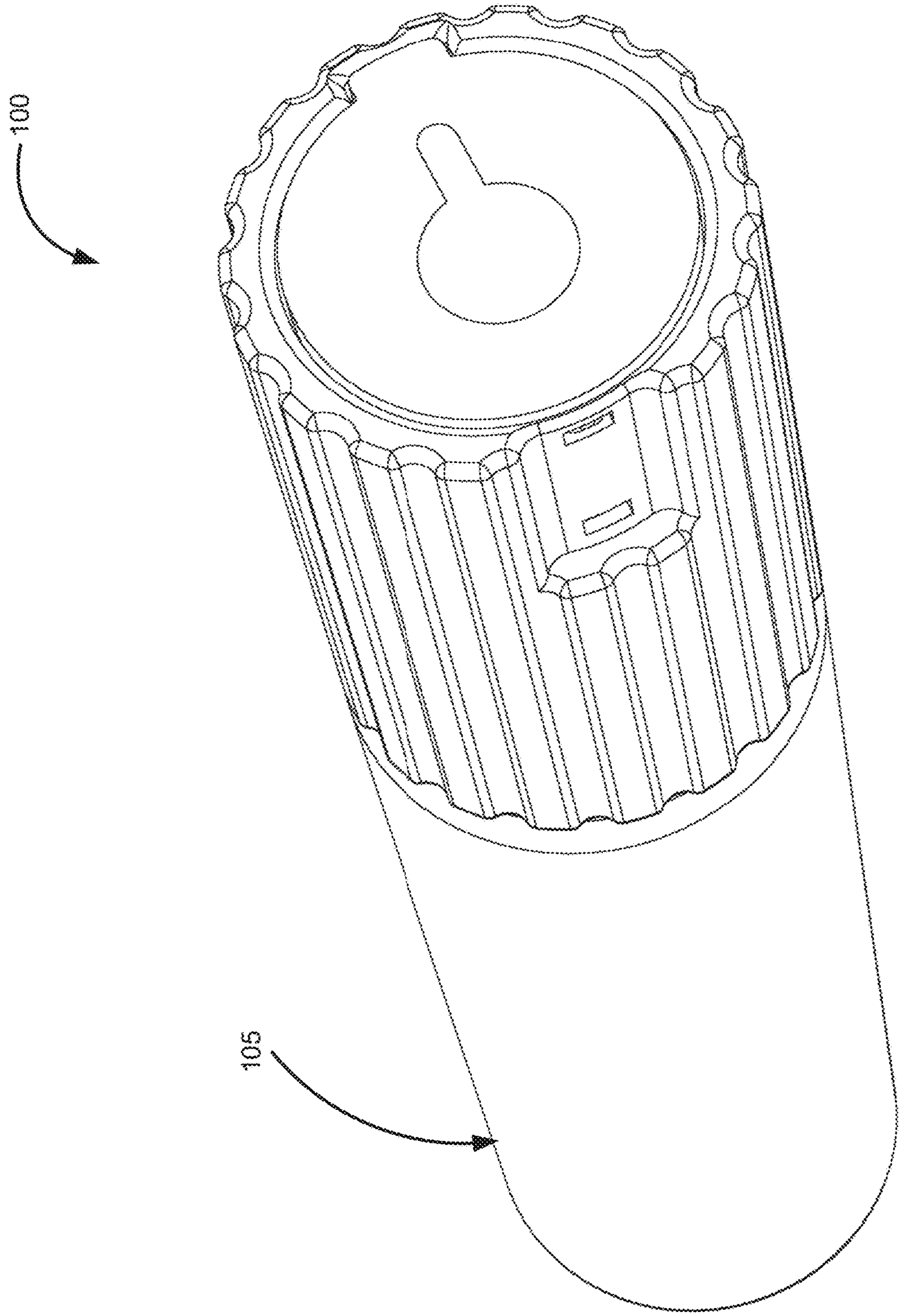
FIG. 1A illustrates an exemplary vial cap coupled to a vial in accordance with an exemplary embodiment.
Figure 1B:
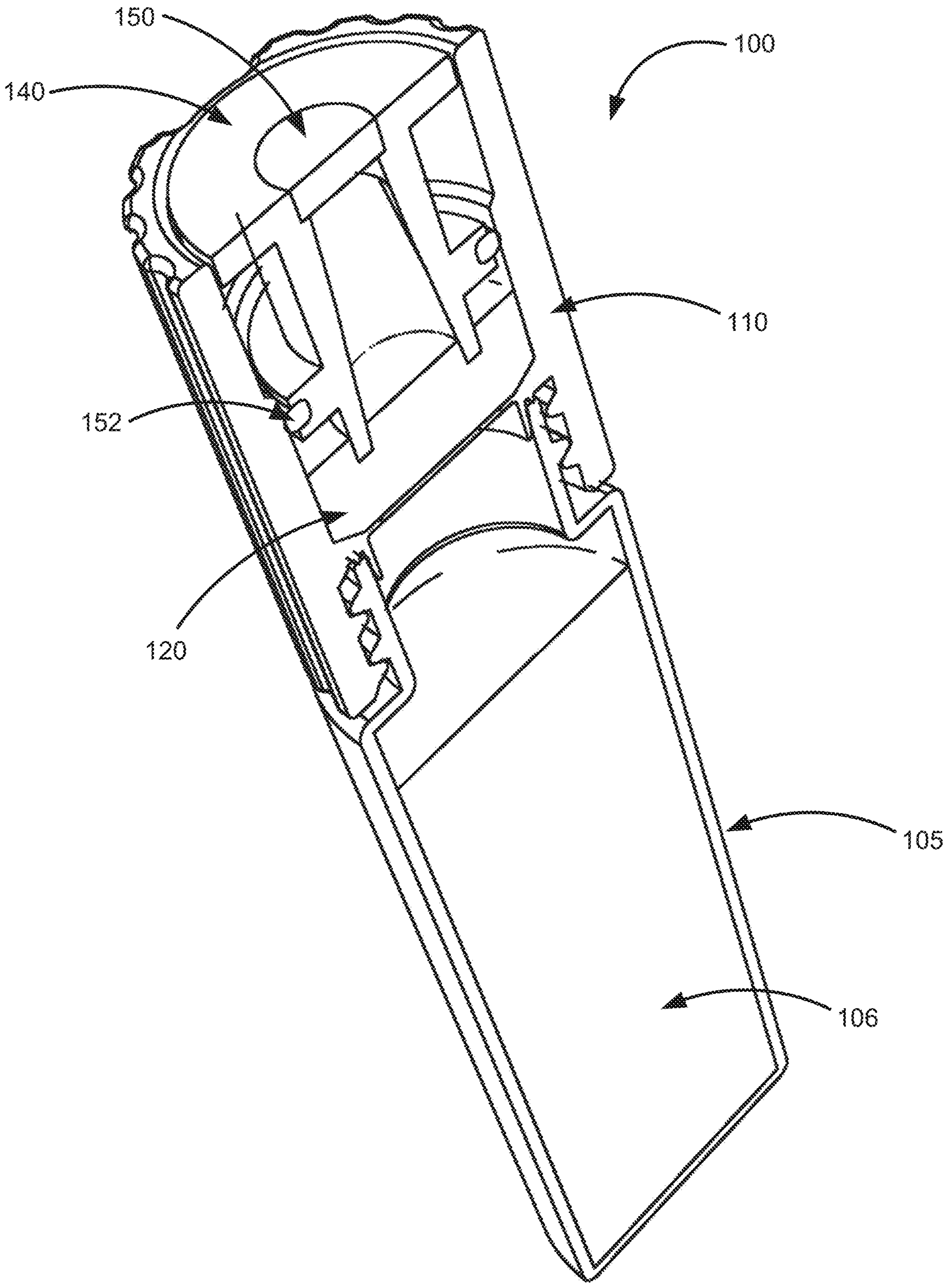
FIG. 1B illustrates a cutaway view of an exemplary vial cap coupled to a vial in accordance with an exemplary embodiment.
Figure 1C:
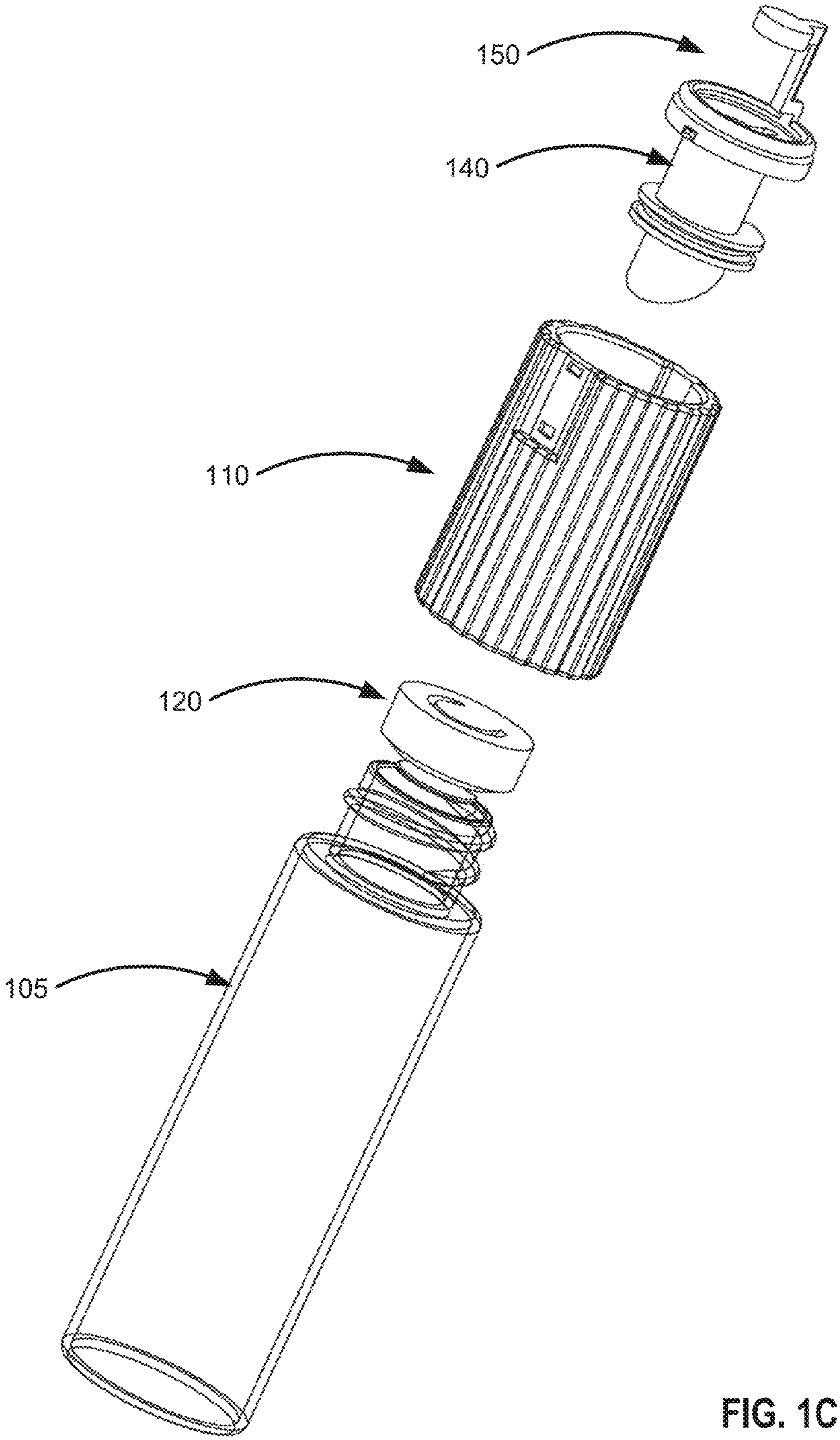
FIG. 1C illustrates an exploded view of an exemplary vial cap coupled to a vial in accordance with an exemplary embodiment.

With initial reference to FIGS. 1A, 1B, and 1C, in various exemplary embodiments a vial cap 100 is configured to releasably contain a portion of a material 120, for example a powdered medication, for dispensing into a container, for example vial 105. Vial cap 100 may be configured to thread onto a vial 105. A depressable plunger 140 in vial cap 100 may be depressed to release material 120 from the bottom of vial cap 100. Via operation of vial cap 100, a medication may be introduced into vial 105 for rehydration and mixing with a liquid 106. Thereafter, the mixture may be extracted, for example via a needle inserted through a septum in vial cap 100. In this manner, a rehydrated medication may be provided in a predetermined amount and at a desired time.

Figure 2:
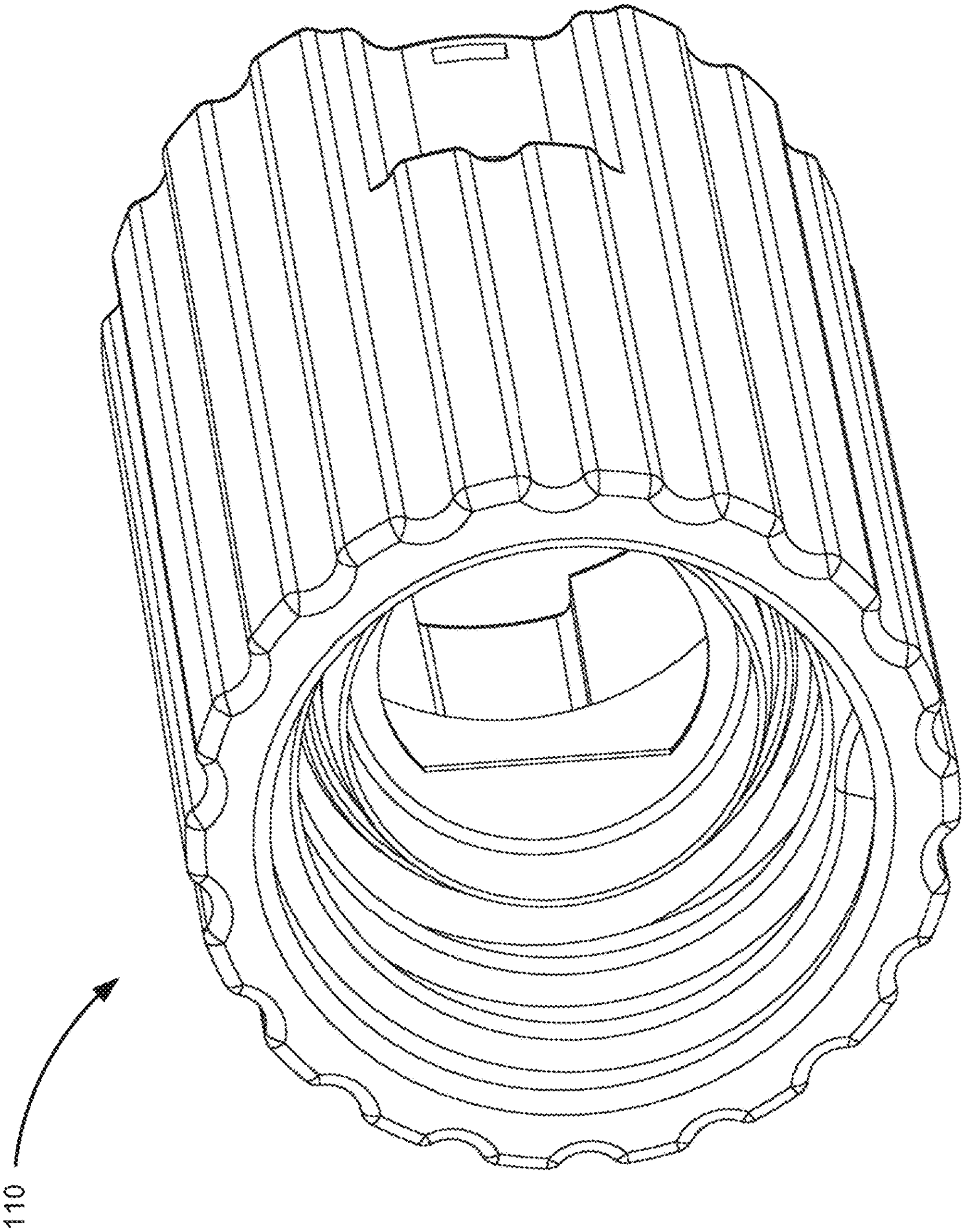
FIG. 2 illustrates a vial cap body in accordance with an exemplary embodiment.

With reference now to FIG. 2, in various exemplary embodiments vial cap 100 comprises a cap body 110. Cap body 110 may be designed as a single piece for a low manufacturing cost. Moreover, cap body 110 may be configured with threads for coupling to a vial or other container, and may be configured with a ridged outer surface for turning grip. Additionally, cap body 110 may be configured with: an internal pre-scored perforate-able membrane; a poke-yoke feature for correct assembly; a guide surface or surfaces for an upper plunger flange to keep the plunger aligned during plunger movement; two snap locations for a plunger (pre- and post-deployment); a flexible area to allow the snap feature to function; a stop ledge to limit plunger travel and to facilitate mixing; and a size that facilitates single finger operation while protecting the plunger from accidental activation.

Figure 3:
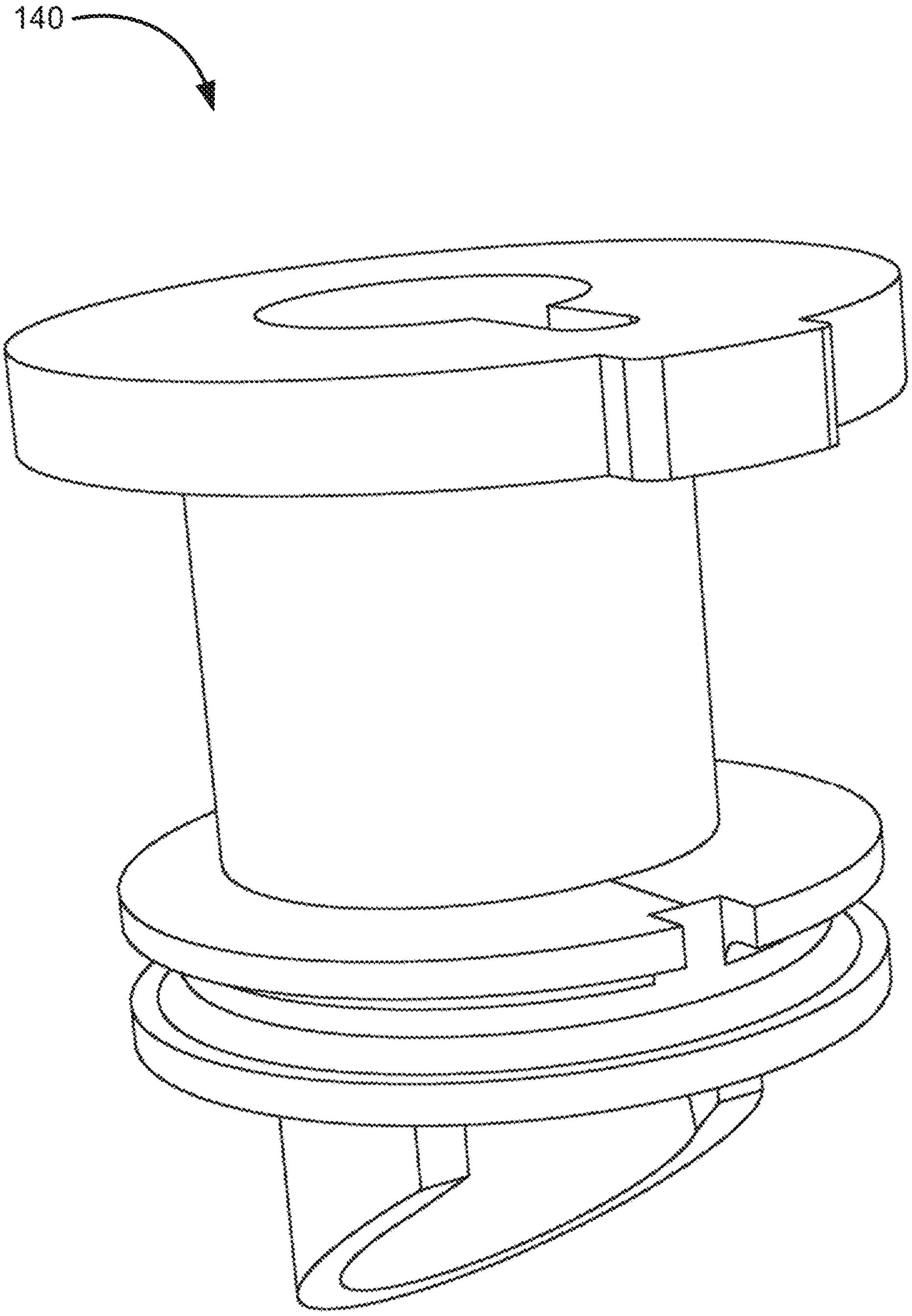
FIG. 3 illustrates a plunger for a vial cap in accordance with an exemplary embodiment.

With reference now to FIG. 3, in an exemplary embodiment vial cap 100 utilizes a depressable plunger 140. In various exemplary embodiments, plunger 140 is configured as the base component of a 2-shot injection molded plunger/septum assembly for low manufacturing cost. In various exemplary embodiments, plunger 140: is configured with two circular ribs that act to keep it centered and concentric with cap body 110 during movement; has a sharp knife like feature for perforating the membrane of cap body 110; has a heel feature that fully rotates the perforated membrane out of a needle path; provides an open center to allow for needle passage; has a snap feature for pre- and post-deployment positioning; has a poke-yoke feature for manufacturing assembly; and provides structure to house the features of combined septum and O-ring 150.

Figure 4:
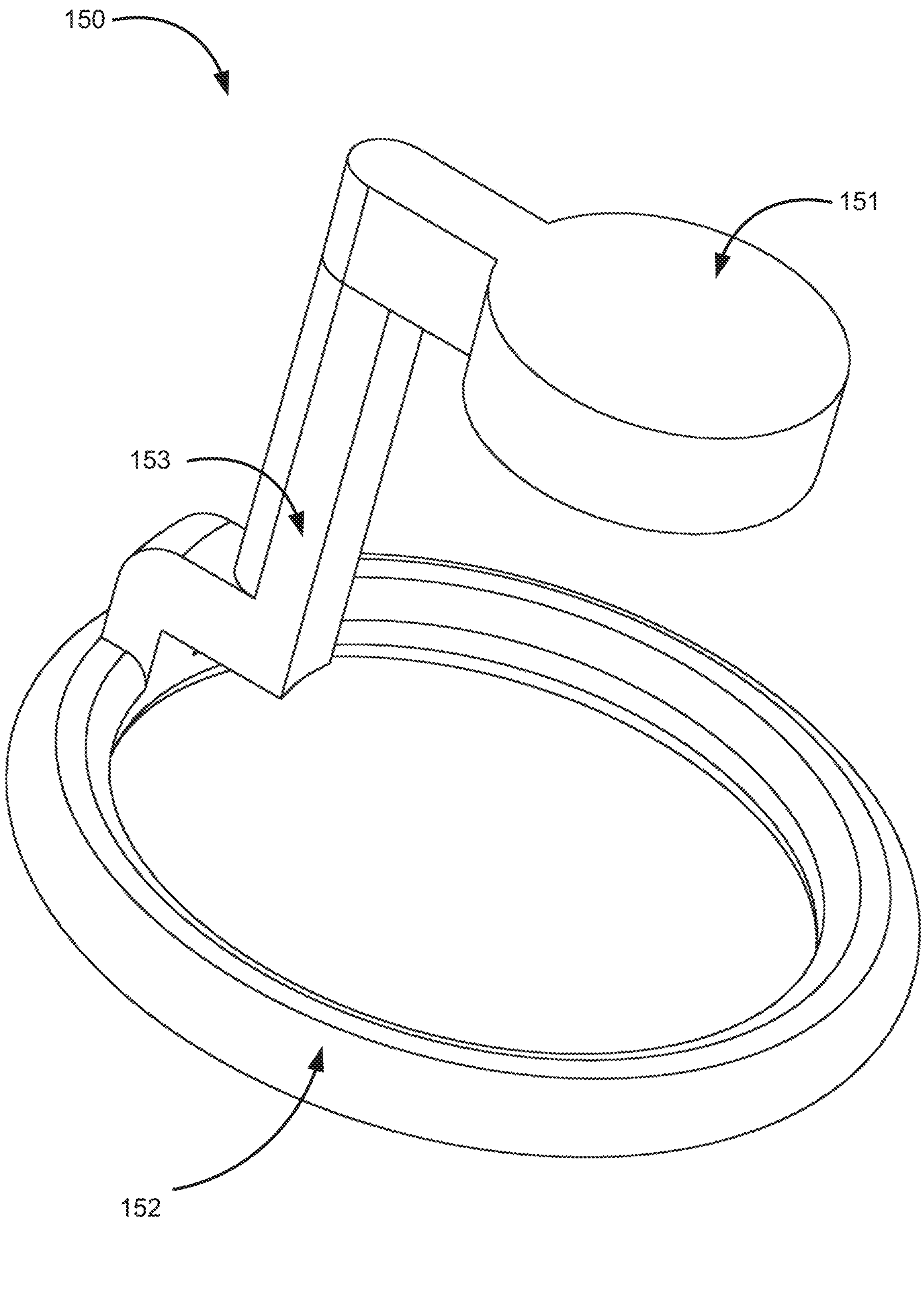
FIG. 4 illustrates a combined septum and o-ring for a vial cap in accordance with an exemplary embodiment.
Figure 5A:
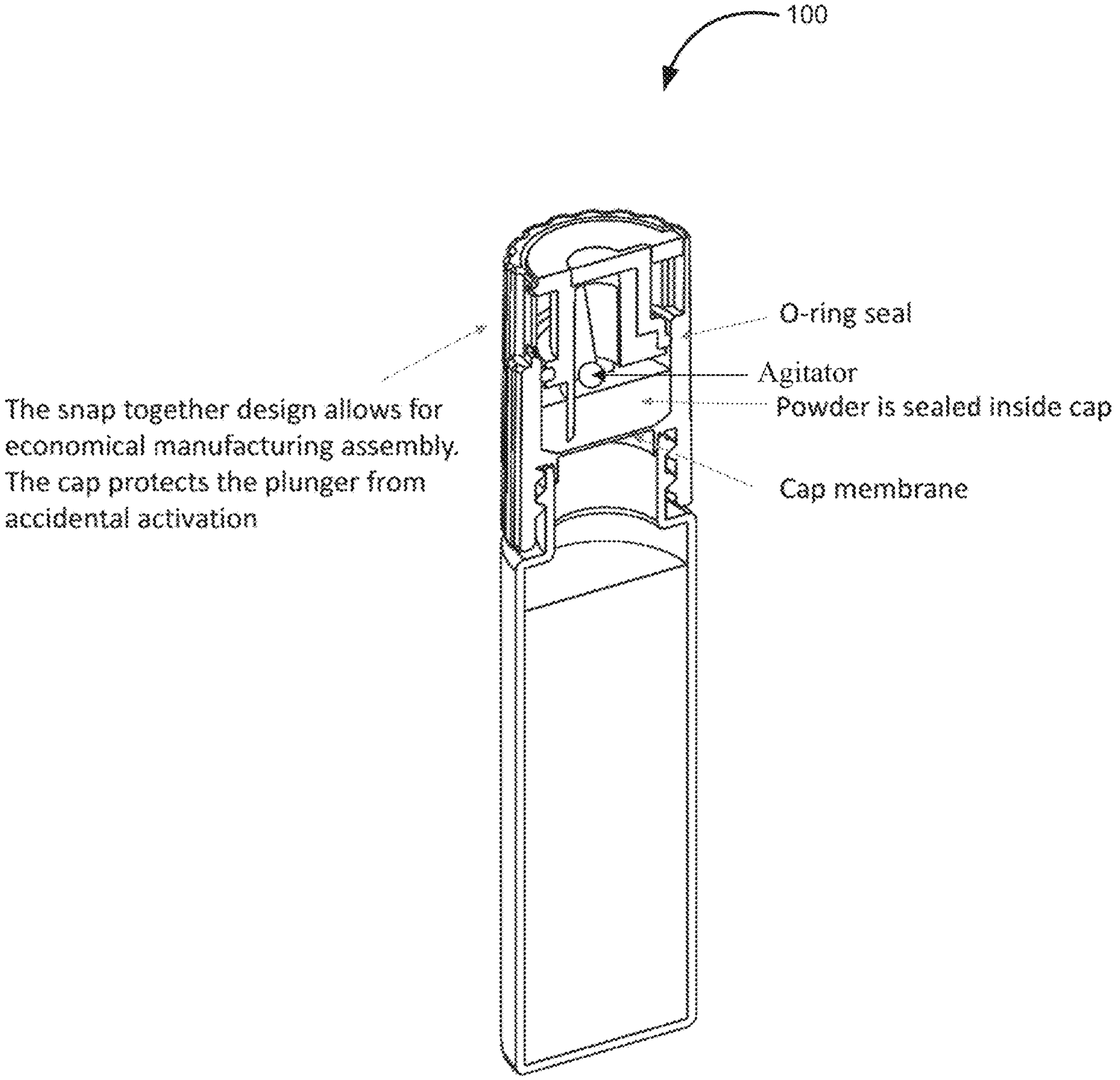
FIGS. 5A through 5F illustrate features and components of a vial cap in accordance with various exemplary embodiments.
Figure 5B:
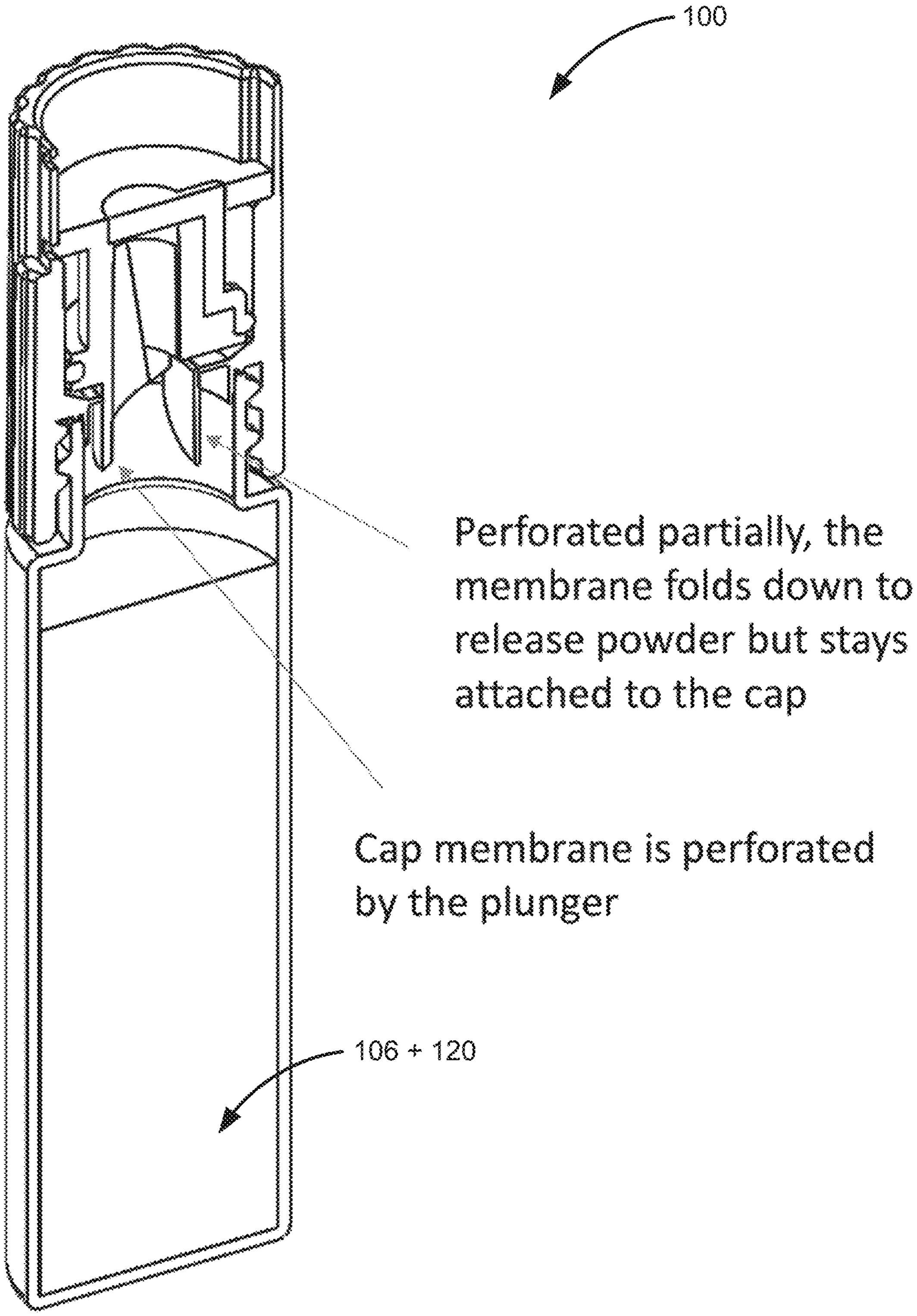
Figure 5C:
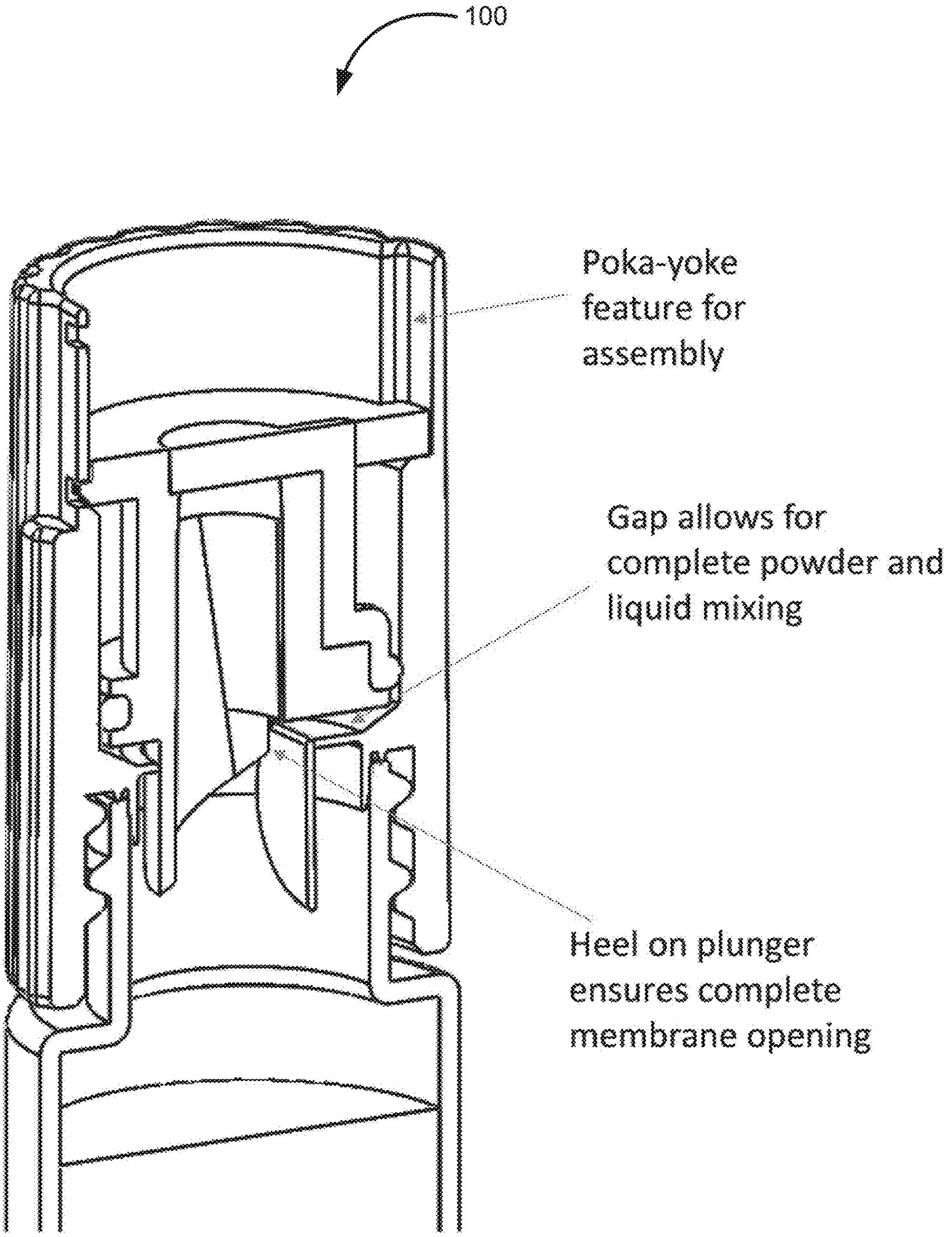
Figure 5D:
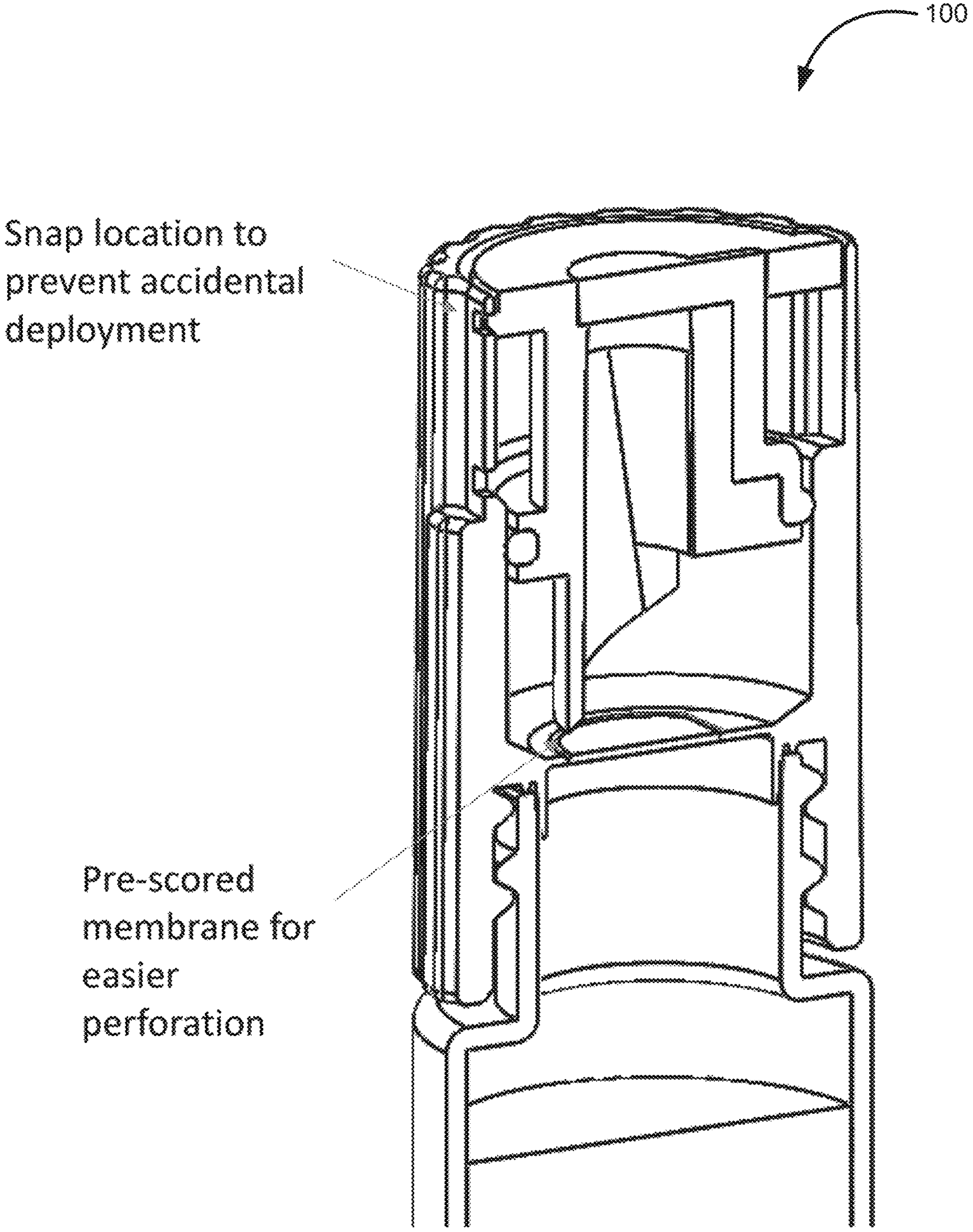
Figure 5E:
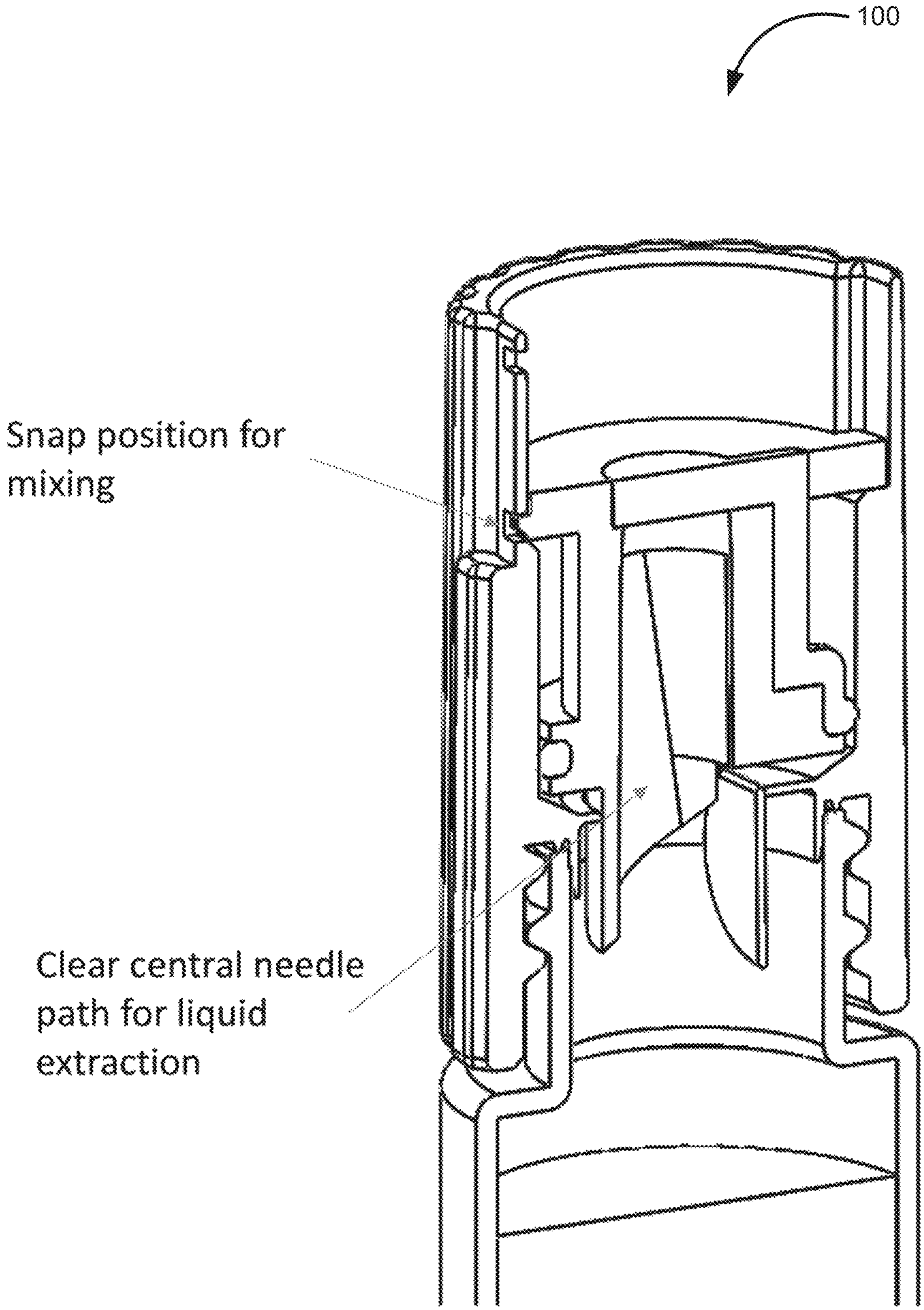
Figure 5F:
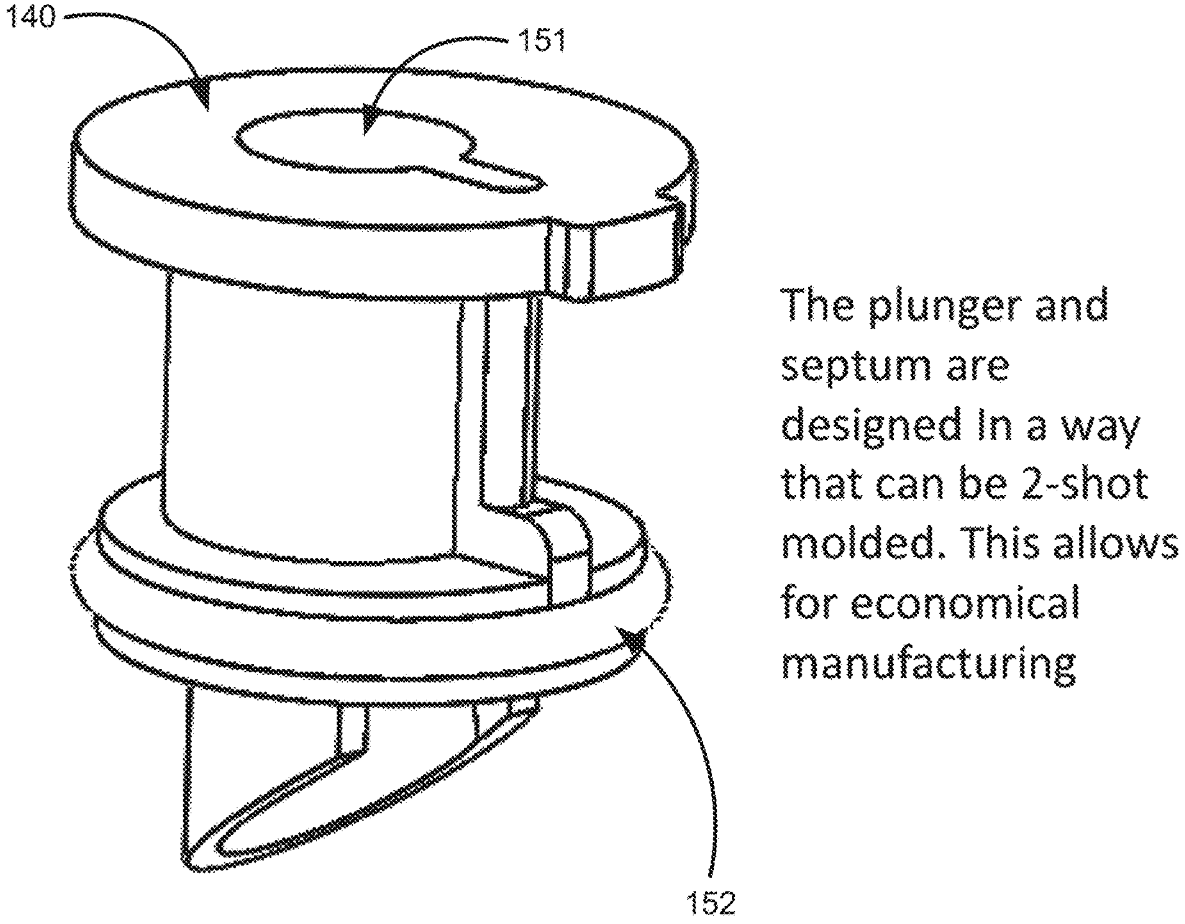

Turning now to FIG. 4, in an exemplary embodiment vial cap 100 utilizes a combined o-ring and septum 150. Combined o-ring and septum 150 may be configured with an o-ring 152 and septum 151 linked by a riser 153. In various exemplary embodiments, combined o-ring and septum 150 is configured as the second component of a 2-shot injection molded plunger/septum part for low manufacturing cost. Septum 151 is located in the assembly center to allow for easy needle access, septum 151 seals the internal powder initially and liquid after deployment, o-ring 152 seals the internal powder initially and liquid after deployment, and o-ring 152 provides a movable seal for operation of plunger 140.

Additional details regarding configuration and operation of vial cap 100 and components thereof are illustrated in FIGS. 5A through 5F. Additionally, vial cap 100 may include one or more mixing agents, agitators, and/or the like, to facilitate mixing of the powdered material once deployed into the vial. For example, a stainless steel ball may be disposed within the powdered material and may drop into the vial upon operation of plunger 140. When the vial is agitated, the stainless steel ball facilitates mixing of the contents.

Figure 6A:
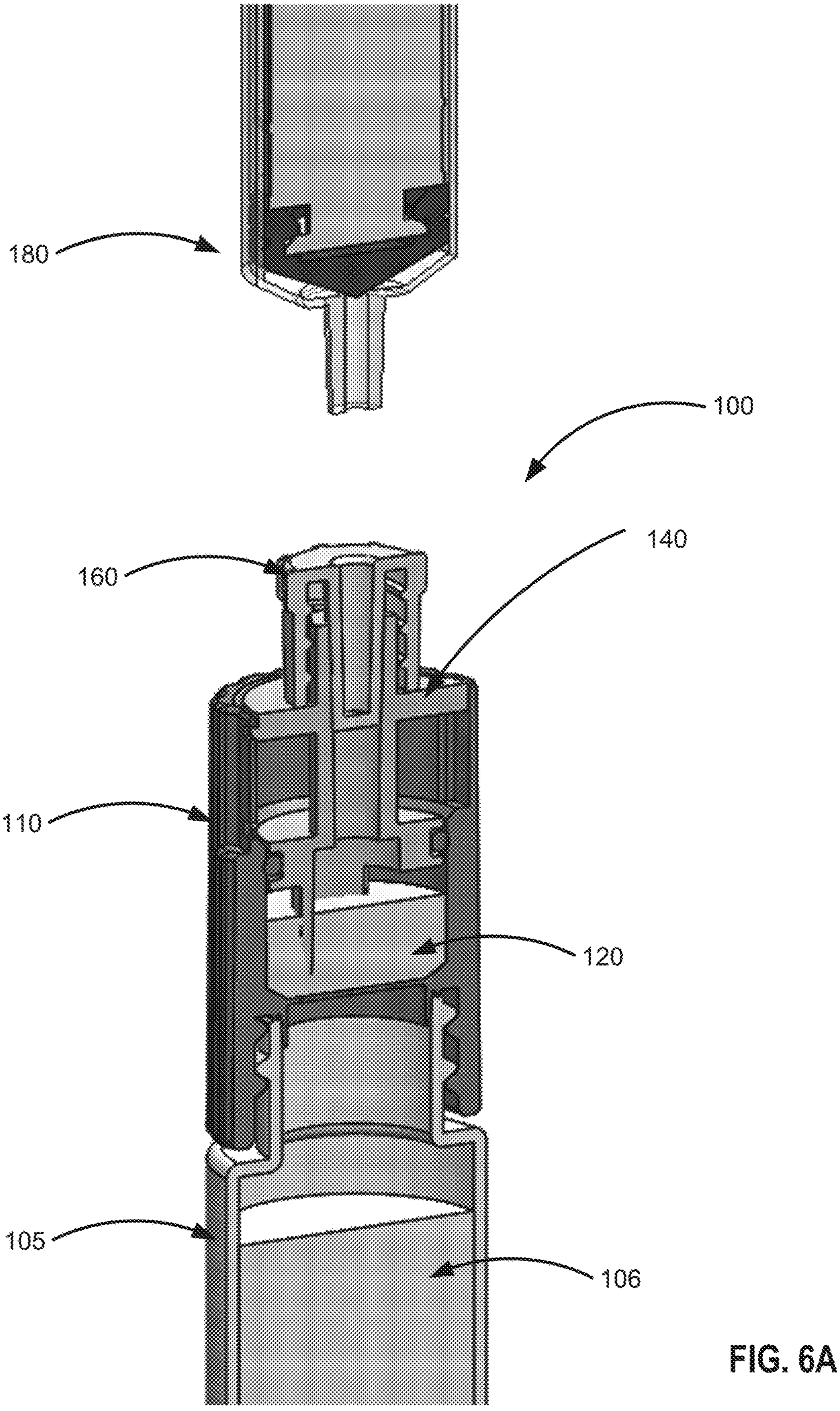
FIGS. 6A and 6B illustrate an exemplary vial cap having a Luer cap in accordance with various exemplary embodiments.
Figure 6B:
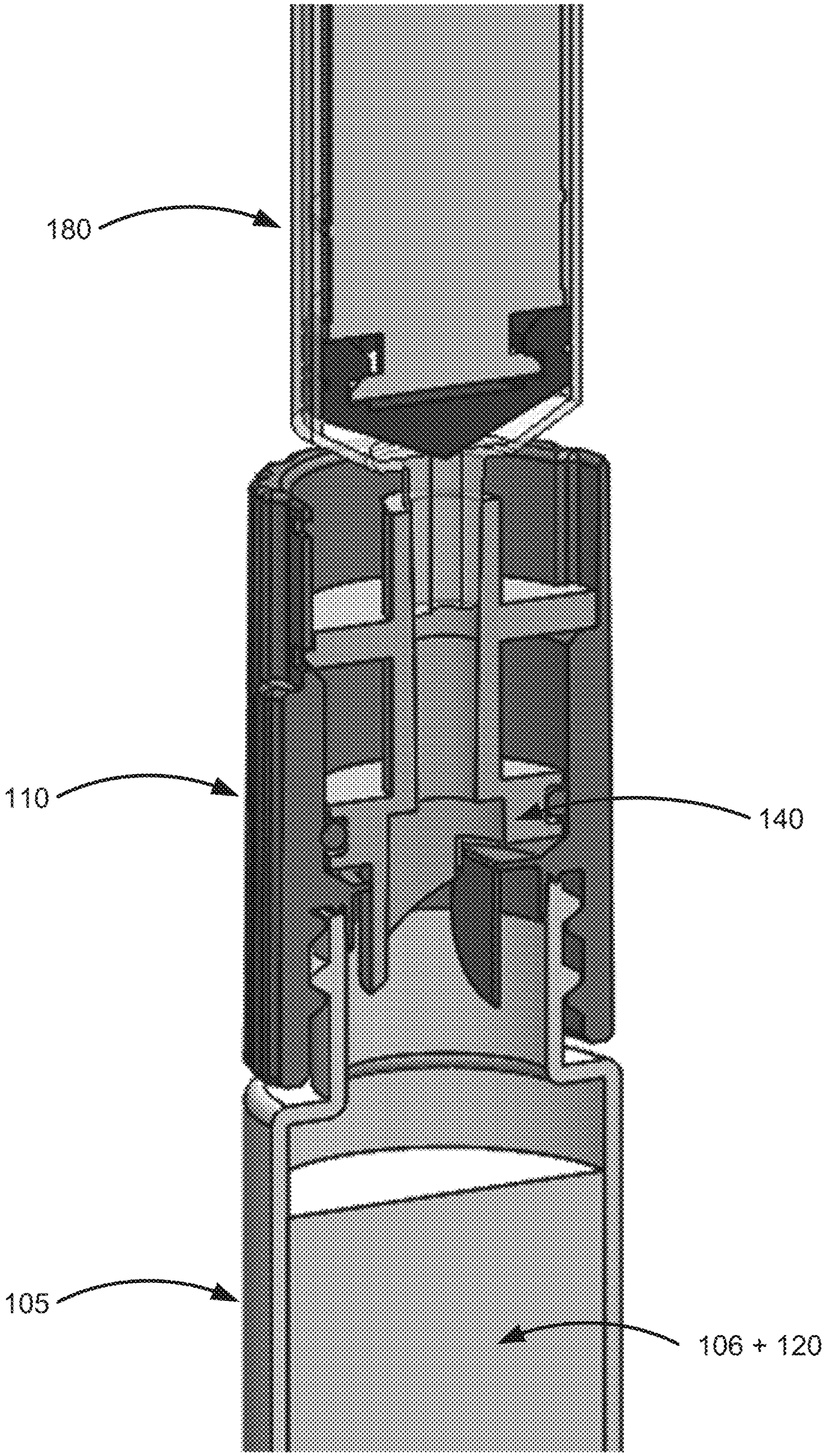
Figure 6C:
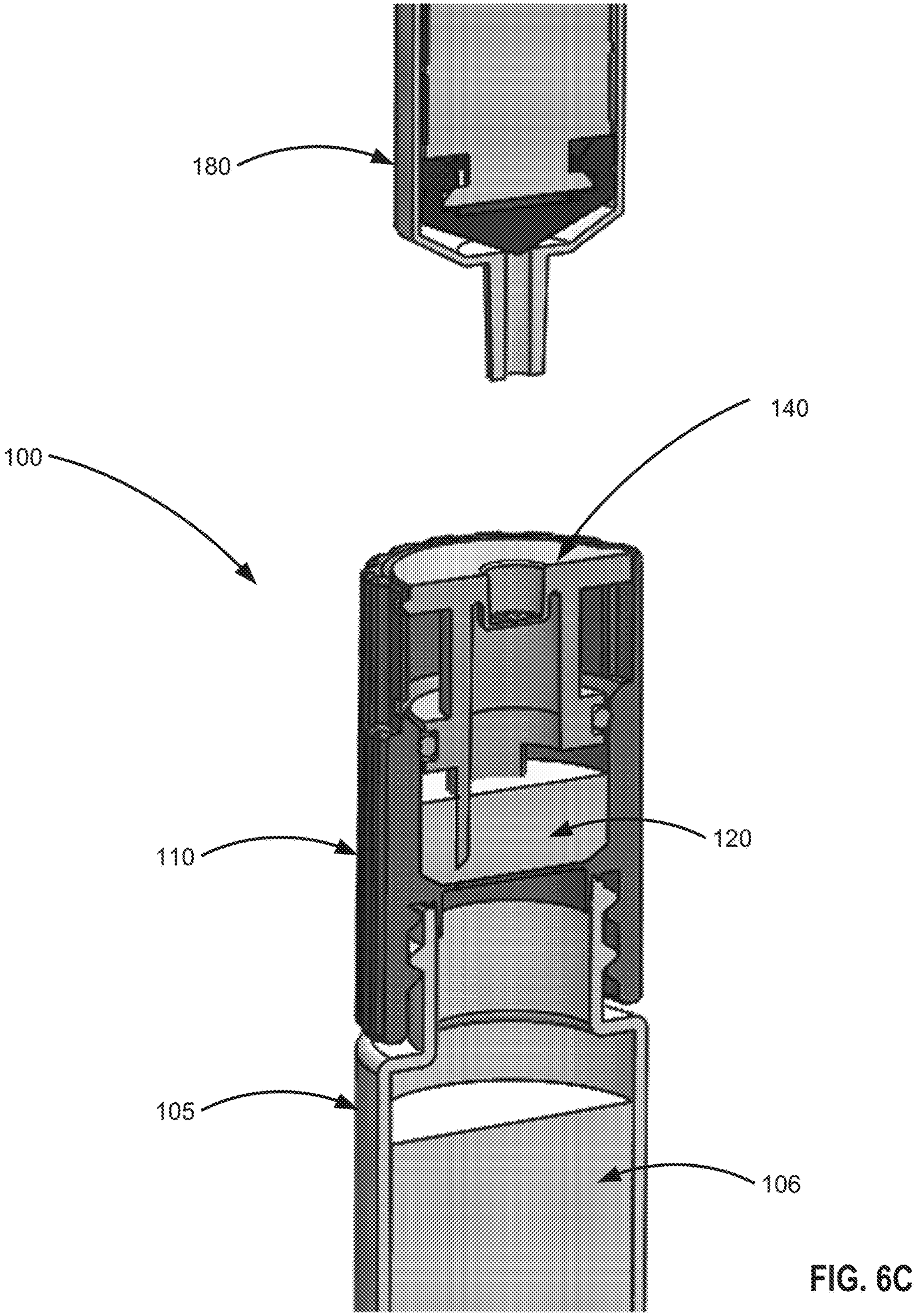
FIGS. 6C through 6F illustrate an exemplary vial cap wherein the plunger is configured for interaction with Luer fluid fittings in accordance with various exemplary embodiments.
Figure 6D:
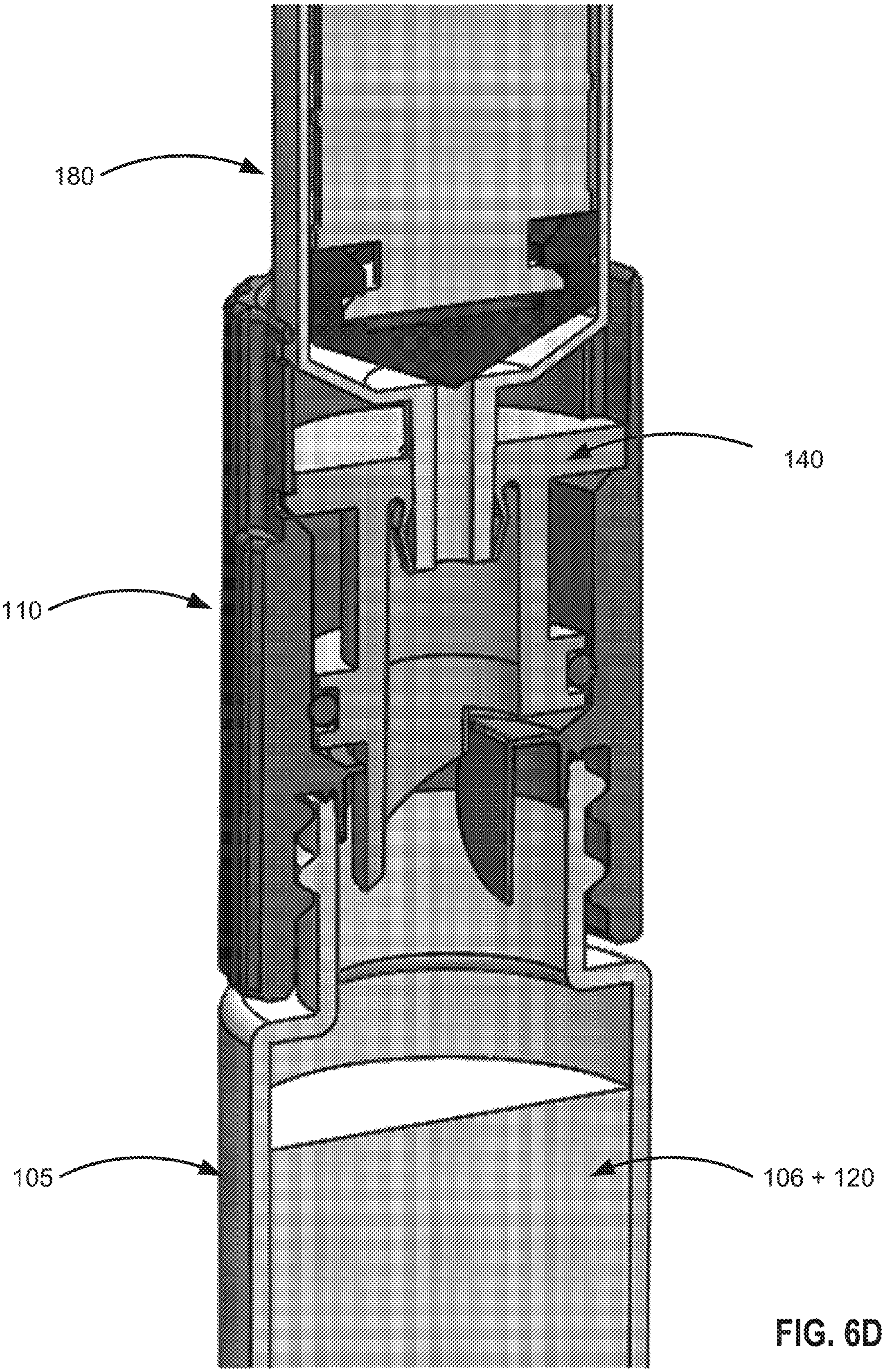

In various exemplary embodiments, with reference to FIGS. 6A and 6B, plunger 140 may be configured with a fitting for a Luer cap 160. In these exemplary embodiments, vial cap 100 may be compatible for use with a syringe 180 having a Luer tip. For example, in operation, plunger 140 may be depressed, releasing material 120 which may be mixed with a fluid, for example by shaking. The threaded Luer cap 160 may be removed, allowing syringe 180 to be inserted into the Luer taper fitting of plunger 140. A portion of fluid/material 120 mixture may be extracted into syringe 180, and syringe 180 is then removed from plunger 140. At this point, Luer cap 160 may be replaced, sealing vial 100 so that a portion of the contents, such as a second dose of medication, may be utilized at a later time.

Figure 6E:
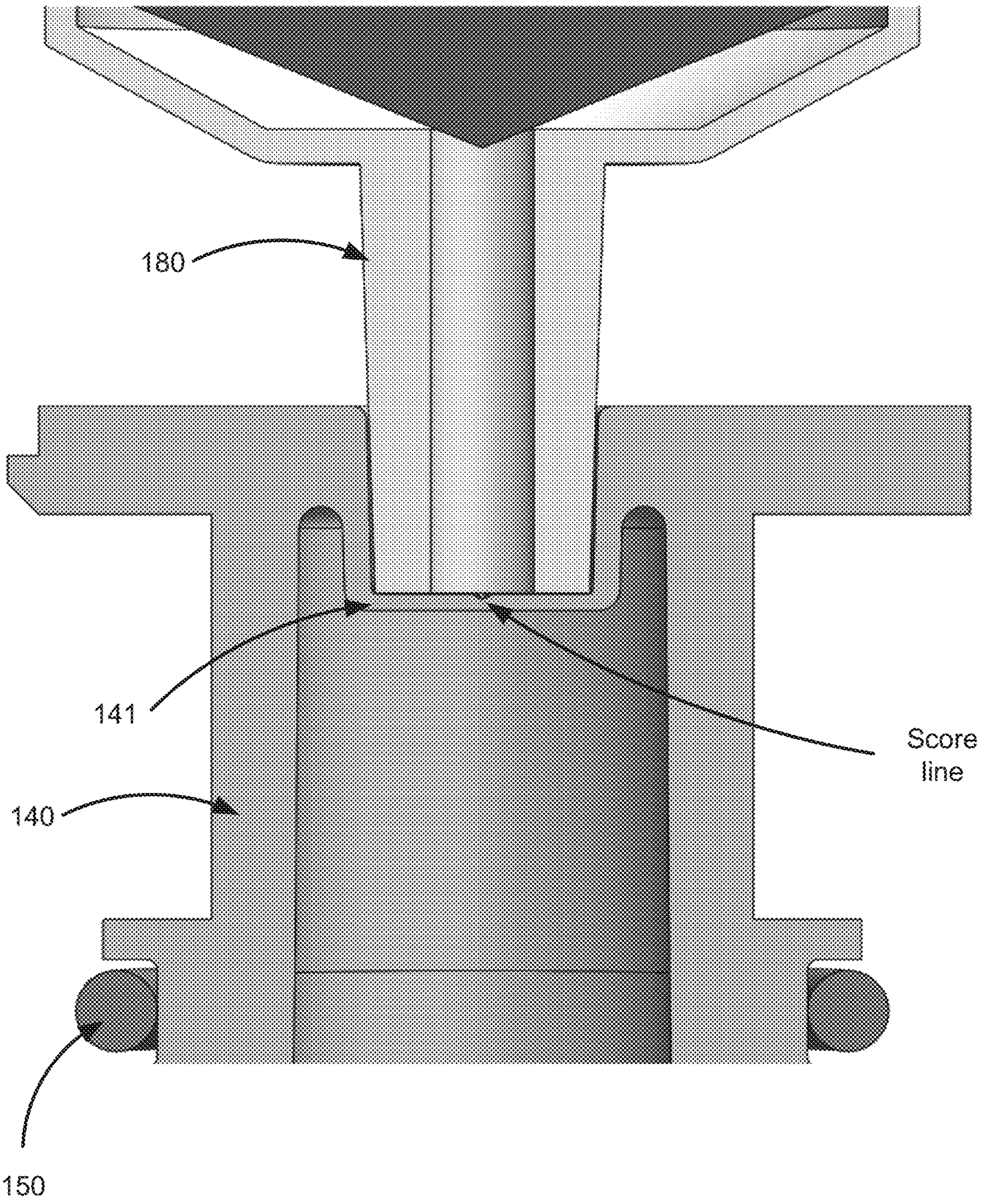
Figure 6F:
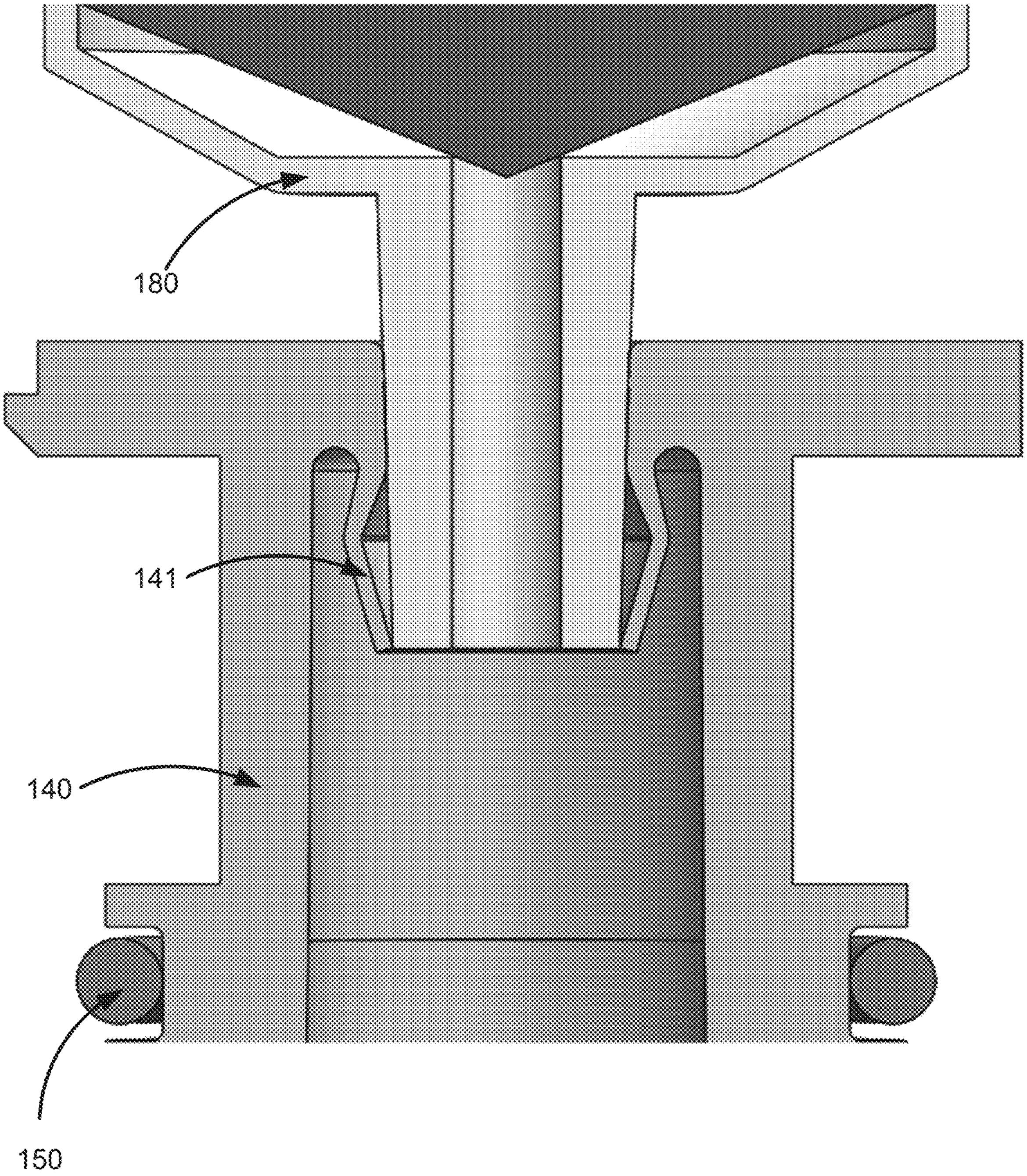

With reference now to FIGS. 6C through 6F, in some exemplary embodiments plunger 140 may be configured with a membrane 141 that is perforable by syringe 180. In these exemplary embodiments, plunger 140 may be depressed and the resulting material/fluid combination may be mixed by shaking vial 105. Thereafter, syringe 180 may be inserted through a scored membrane 141 in plunger 140 as shown in FIGS. 6E and 6F. A portion of fluid/material 120 mixture may be extracted into syringe 180, and syringe 180 is then removed from plunger 140.

As compared to prior approaches for material rehydration and/or mixing, vial cap 100 is designed for low-cost manufacturing and assembly, has a small compact size, and a simple intuitive function, leading to fewer steps for use. In vial cap 100, plunger 140 is fully protected and snapped into position to prevent accidental deployment or disassembly. Vial cap 100 allows for deployment with only one hand. When deployed, plunger 140 snaps into forward position allowing for shaking without holding plunger 140. After deployment, plunger 140 locks in a depressed position, providing easy identification of used product.

Additionally, when vial cap 100 is utilized, partially used vials stay sealed for easy disposal. The size of vial cap 100 may be varied to accommodate a desired amount of powdered material. Moreover, a particular vial cap 100 can be used on many vial sizes. The stand-alone design of vial cap 100 allows for containing powder without being assembled to a vial, allowing for great flexibility in how products can be fulfilled during manufacturing and can be supplied to users. For example, vial cap 100 may be provided as: filled vial cap 100 only, filled vial cap 100 and filled vial, filled vial cap 100 and empty vial, filled vial cap 100 and any number of filled vials with different liquids to be matched as needed.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments.

However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

What is claimed is:

1. A cap for a container holding a liquid, the cap comprising:
- a cap body comprising a durable material, the cap body comprising a radially inner surface that at least partially defines a space for containing an anhydrous material, the cap body further comprising a thread configured to couple to a vial;
- a depressable plunger coupled to the cap body, the depressable plunger comprising:
  - a tubular element extending from a first end to a second end and at least partially defining a longitudinal axis, the tubular element comprising a radially outer surface;
  - a first flange extending radially outward from the radially outer surface,
  - a second flange extending radially outward from the radially outer surface, the second flange spaced apart longitudinally from the first flange, the second flange comprising an annular groove disposed therein, and
  - an extended portion that extends longitudinally from the second flange and away from the first flange, the extended portion configured to release the anhydrous material into the liquid when the depressable plunger is depressed, wherein the depressable plunger is longitudinally contained within the cap body;
- a flexible O-ring operable as a seal for the depressable plunger, the flexible O-ring disposed at least partially within the annular groove of the second flange, the flexible O-ring disposed radially between the radially inner surface of the cap body and the annular groove; and a septum disposed at least partially within the depressable plunger, the septum operable to permit a needle to pass therethrough to access the liquid;

wherein the flexible O-ring and the septum are monolithic; and wherein the flexible O-ring and the septum are separate unit with the depressable plunger.

2. The cap of claim 1, wherein the depressable plunger is positioned radially inward of protected from accidental activation by being at least partially contained within the cap body.

3. The cap of claim 1, further comprising a releasable agitator disposed in the space for containing the anhydrous material.

4. The cap of claim 1, wherein the anhydrous material is a medication that must be administered intravenously.

5. The cap of claim 1, wherein the depressable plunger comprises a heel that forces a portion of a membrane into an opened position, and wherein the membrane at least partially surrounds the anhydrous material.

6. The cap of claim 1, wherein the cap body is configured to lock the depressable plunger into a depressed position in response to depressing the depressable plunger.

7. The cap of claim 1, wherein the septum and the flexible O-ring are configured to seal an internal cavity of the vial from an external environment in response to coupling the cap to the vial.

8. The cap of claim 1, further comprising the anhydrous material disposed within the cap body.

9. The cap of claim 8, further comprising a membrane spaced apart longitudinally from the second flange, wherein the anhydrous material is disposed longitudinally between the second flange and the membrane.

10. The cap of claim 9, further comprising an agitator disposed longitudinally between the septum and the membrane.

11. The cap of claim 9, further comprising a score disposed in the membrane.

12. The cap of claim 11, wherein the score is configured to facilitate perforation of the membrane in response to the depressable plunger being depressed and the extended portion piercing the score.

13. The cap of claim 1, wherein:

the cap body comprises a first snap feature spaced apart longitudinally from a second snap feature, the first snap feature comprising a first aperture disposed in the radially inner surface of the cap body, and the second snap feature comprising a second aperture disposed in the radially inner surface of the cap body.

14. The cap of claim 13, further comprising a pre-activated configuration and an activated configuration, wherein:

the pre-activated configuration comprises the first flange snapped into the first snap feature, and the activated configuration comprises the first flange snapped into the second snap feature.

* * * * *